(12) United States Patent
Tantalo et al.

(10) Patent No.: US 6,891,570 B2
(45) Date of Patent: May 10, 2005

(54) METHOD AND ADAPTIVELY DERIVING EXPOSURE TIME AND FRAME RATE FROM IMAGE MOTION

(75) Inventors: Theodore A. Tantalo, Rochester, NY (US); Robert A. Fiete, Fairport, NY (US); Frederick J. Warner, Rochester, NY (US)

(73) Assignee: ITT Manufacturing Enterprises Inc., Wilmington, DE (US)

( * ) Notice: Subject to any disclaimer, the term of this patent is extended or adjusted under 35 U.S.C. 154(b) by 797 days.

(21) Appl. No.: 09/773,299

(22) Filed: Jan. 31, 2001

(65) Prior Publication Data

US 2002/0149693 A1 Oct. 17, 2002

(51) Int. Cl.⁷ .......................... H04N 5/235; H04N 9/64; H04N 5/225; G06K 9/00; G06T 13/00
(52) U.S. Cl. ...................... 348/362; 348/248; 348/169; 382/107; 345/474
(58) Field of Search .................................. 348/169, 155, 348/248, 362, 296, 364, 241, 335; 382/107; 345/474, 475

(56) References Cited

U.S. PATENT DOCUMENTS

| | | | |
|---|---|---|---|
| 4,345,825 A | * | 8/1982 | Matteson et al. ........... 396/106 |
| 4,652,907 A | | 3/1987 | Fling |
| 4,882,629 A | | 11/1989 | Faulkerson et al. |
| 4,918,522 A | | 4/1990 | Pajunen |
| 5,583,947 A | * | 12/1996 | Florent ........................ 382/103 |
| 5,721,692 A | * | 2/1998 | Nagaya et al. .............. 345/475 |
| 5,883,969 A | * | 3/1999 | Le Gouzouguec et al. . 382/103 |
| 5,969,755 A | * | 10/1999 | Courtney ...................... 348/143 |
| 6,298,143 B1 | * | 10/2001 | Kikuchi et al. ............. 382/103 |
| 6,448,545 B1 | * | 9/2002 | Chen .................... 250/214 VT |

* cited by examiner

*Primary Examiner*—Andrew Christensen
*Assistant Examiner*—Lin Ye
(74) *Attorney, Agent, or Firm*—RatnerPrestia

(57) ABSTRACT

In a method for determining the frame rate and exposure time for each frame of a video collection, an image capture system acquires at least two successive frames of a scene, separated in time. The two images are compared to determine if objects in the scene are in motion. If motion is detected, then the speed and displacement of the objects that are moving is determined. If the speed of the fastest moving object creates an unacceptable amount of image displacement, then the frame rate for the next frame is changed to one that produces an acceptable amount of image displacement. Also, if the speed of the fastest moving object creates an unacceptable amount of motion blur, then the exposure time for the next frame is changed to one that produces an acceptable amount of motion blur.

15 Claims, 3 Drawing Sheets

METHOD AND ADAPTIVELY DERIVING EXPOSURE TIME AND FRAME RATE FROM IMAGE MOTION

FIELD OF THE INVENTION

The invention relates generally to a method for determining the exposure time and frame rate of an image capture system in order to minimize the motion blur between successive frames.

BACKGROUND OF THE INVENTION

FIG. 1 illustrates an image capture system, such as a camera, having an imaging lens 10 with a focal length f and an imaging sensor 12. An object 14 at a distance $d_o$ in front of the camera will be properly focused at the imaging sensor 12 at a distance $d_i$ behind the lens if the relationship between $d_o$, $d_i$ and f is $$\frac{1}{d_o} + \frac{1}{d_i} = \frac{1}{f}. \tag{1}$$

If an object 14 is moving at a constant velocity v (m/s) within the field of view (FOV) 16 of the scene, and the exposure time of the image capture system is Δt, then the object will appear smeared in the image over a distance s, given by $$s = \frac{d_i}{d_o} v \Delta t \; (meters). \tag{2}$$

If the imaging sensor 12 captures a digital image, then the object will be displaced by a distance s, measured in pixels, given by $$s = \frac{d_i}{d_o p} v \Delta t \; (pixels), \tag{3}$$

where p is the distance between adjacent detector elements in the digital detector array. Also, if the image capture system moves with respect to the scene at a velocity v during the exposure time of the image, then the entire scene within the FOV 16 will be smeared over a distance s.

The image smear can be reduced if the exposure time is decreased, but this will decrease the signal at the detector. If the signal is measured as the number of electrons produced by the object at the detector, then the signal is given by $$S_{object} = \frac{A_{detector} \pi \Delta t}{4(f\#)^2 hc} \int_{\lambda_{min}}^{\lambda_{max}} \eta(\lambda) L_{object}(\lambda) \tau_{optics}(\lambda) \lambda d\lambda, \tag{4}$$

where λ is the wavelength of light, $\tau_{optics}$ is the transmittance of the optical system, $L_{object}$ is the spectral radiance of the object, η is the detector quantum efficiency, $A_{detector}$ is the area of the detector element, f# is the optical system f-number, h is Planck's constant, and c is the speed of light. Random noise arises from elements that add uncertainty to the signal level of the target and is quantified by the standard deviation of its statistical distribution $\sigma_{noise}$. The signal-to-noise ratio (SNR) of the image is given by $$SNR = \frac{\text{mean object signal}}{\text{signal deviation}} = \frac{S_{object}}{\sigma_{noise}}. \tag{5}$$

Reducing the exposure time will decrease the image smear, but will also reduce the signal and the SNR of the image, generally resulting in an image that appears noisier.

Referring to FIG. 2, when a fast moving object 14 at a velocity v is imaged with a video capture system, the object 14 will be smeared by a distance s and the object 14 will be displaced between the two successive images, i.e. the first image frame 18 and the second image frame 20, by a distance Δd, given by $$\Delta d = \frac{d_i}{d_o p} v t_{clock} \; (pixels), \tag{6}$$

where $t_{clock}$ is the time interval between each successive image. Here a video capture system will be defined as an image capture system that acquires a sequence of images separated in time determined by the frame rate (FR). The frame rate is related to $t_{clock}$ by $$FR = \frac{1}{t_{clock}} \; (frames/s), \tag{7}$$

and $t_{clock} \geq \Delta t$.

If the object displacement and the smear are large enough, then the utility of the video images will be reduced. Longer exposure times are desired to increase the SNR but may cause an unacceptable smear of the object. If the smear is large enough, identification of the object may not be possible. Motion smear above two pixels will cause a loss of information that is generally not recoverable. Lower frame rates are desired to reduce the amount of image data that must be captured, disseminated, and stored, but may not capture enough frames of a fast moving object before it passes through the camera's FOV. Traditional electronic video image capturing devices have a predefined exposure time, or shutter time, and readout each image at a predefined frame rate.

One technique used to acquire high-speed photographs that reduces the image motion smear without producing noisy images is to use a very fast illumination flash, such as a strobe, to decrease the effective exposure time. One such method proposed in U.S. Pat. No. 4,918,522 uses a short light impulse to image a quick-moving object by means of a video method. This is ideal in that it produces a high signal over a very short exposure time. If a strobe is used, then it must be synchronized with the frame rate of the video capture system. Unfortunately, it is not always convenient or even possible to have a high intensity flash source available while acquiring images. For example, image capture systems used for remote sensing can not use a flash source. It is desirable then to capture an image with the longest exposure time possible, to maximize the SNR, but that does not produce an undesirable amount of image motion smear.

With video capture systems, short exposure times can be used to minimize the image motion blur, and then successive frames can be added together to increase the signal. Fast moving objects in the scene can still produce artifacts in the reproduced image. The method proposed in U.S. Pat. No. 4,652,907 adaptively controls the parameters used in a recursive filter to sum the successive frames together to minimize the artifacts, but does not adaptively control the exposure time. Another method proposed in U.S. Pat. No.

4,882,629 adaptively controls the exposure time based on the signal level, but does not account for the motion of objects in the scene.

There is a need therefore for an image capture system that adaptively determines the best exposure time and frame rate based on the detected motion during the imaging sequence, thus keeping the image motion smear and the object displacement at or below a predetermined level.

SUMMARY OF THE INVENTION

The present invention is directed to overcoming one or more of the problems set forth above. Briefly summarized, according to one aspect of the present invention, the invention resides in a method for adaptively determining the exposure time for each frame captured by an image capture system of the type having an image sensor, optics for forming an image of a scene on the image sensor, and an image processor for determining an exposure time for the image sensor. More specifically, one aspect of the invention includes the steps of: a) acquiring two time-separated image frames during an initial exposure time set for each of the image frames, wherein each image frame includes one or more moving objects from the scene; b) spatially registering the two image frames; c) measuring spatial displacements between the two image frames for the same moving objects; d) determining a fastest moving object in the scene from the measured spatial displacements; e) calculating a speed of the fastest moving object; f) calculating object smear for the fastest moving object based on the initial exposure time; g) if the object smear exceeds a maximum desired smear, calculating a new exposure time; and h) setting the exposure time for a subsequent image frame to the new exposure time.

In yet another aspect of the invention, the method adaptively determines the frame rate of a system of the type described above by acquiring the two image frames according to an initial frame rate, then performing steps b) through e) as described above and further calculating the object displacement at the initial frame rate; then, if the object displacement exceeds a maximum desired displacement, a new frame rate is calculated and the frame rate for a subsequent image frame is set to the new frame rate. In yet a further aspect of the invention, the two methods may be combined to adaptively determine both the exposure time and frame rate of the image capture system.

ADVANTAGEOUS EFFECT OF THE INVENTION

This invention allows the exposure time and frame rate for each frame of a video image capture system to be automatically determined. The exposure time is determined such that the signal-to-noise ratio (SNR) is maximized while keeping the motion blur from objects moving in the scene to a predetermined amount. The frame rate is determined such that the object displacement does not exceed a predetermined amount.

DETAILED DESCRIPTION OF THE INVENTION

Because image processing systems are well known, the present description will be directed in particular to attributes forming part of, or cooperating more directly with, the method in accordance with the present invention. Attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the method as described according to the invention in the following materials, software not specifically shown, suggested or described herein that is useful for implementation of the invention is conventional and within the ordinary skill in such arts.

If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
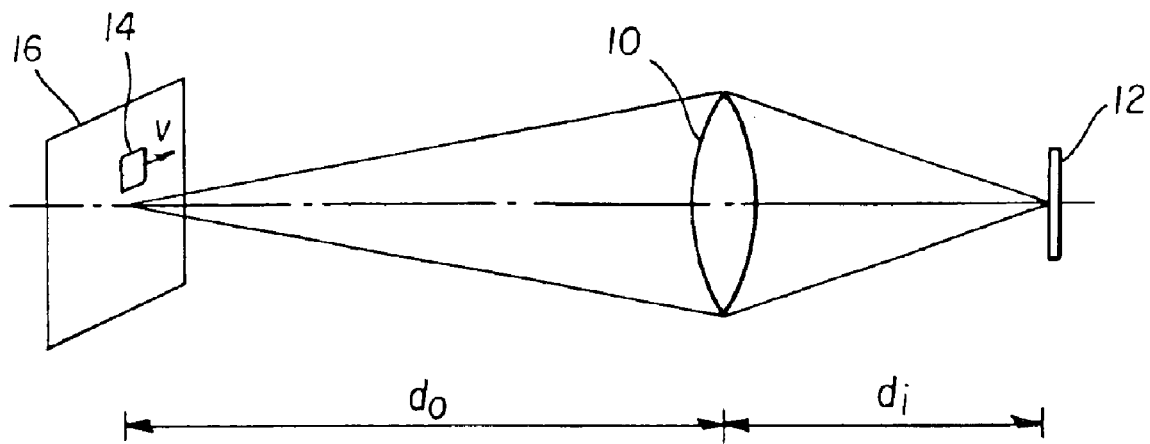
FIG. 1 is a schematic of an image capture system useful in describing the background of the present invention.
Figure 2:
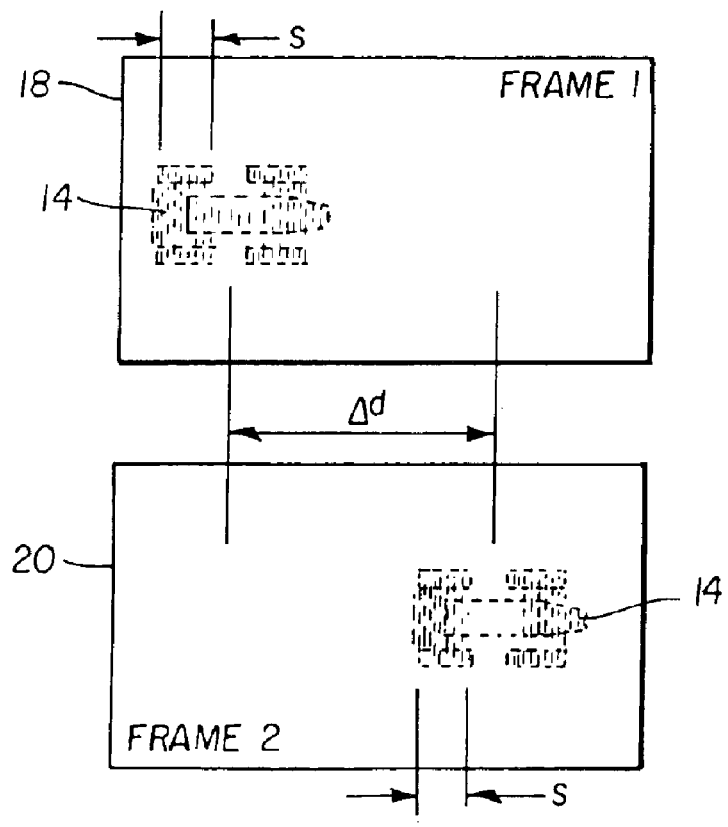
FIG. 2 illustrates the smear and displacement of a moving object between two image frames.
Figure 3:
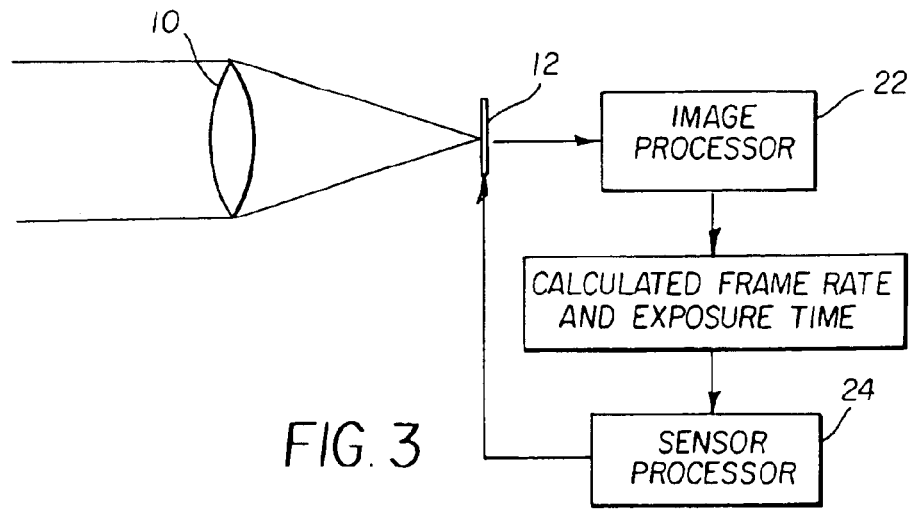
FIG. 3 is a schematic diagram of an adaptive video exposure time and frame rate system according to the present invention.
Figure 4:
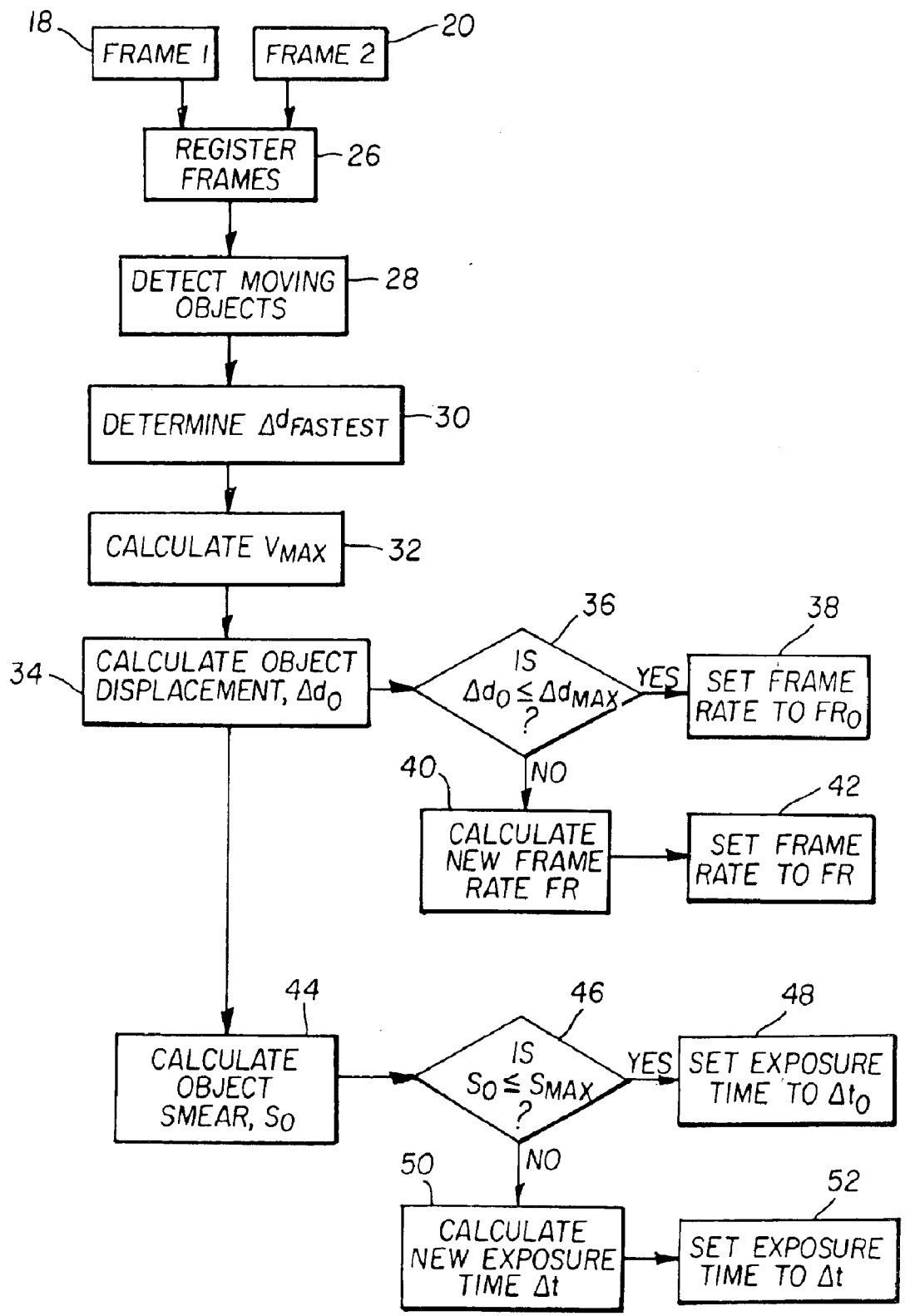
FIG. 4 shows the image processing steps for determining the best exposure time and frame rate.

Referring to FIG. 3, an image capture system according to the present invention includes imaging optics 10, a digital image sensor 12, an image processor 22, and a sensor processor 24. The image processor 22 in FIG. 3 processes the images to determine the best exposure time and frame rate. The flow diagram for the image processor 22 is shown in FIG. 4. Let $\Delta t_0$ and $FR_0$ be the initial exposure time and frame rate desired if no image motion information is available. Generally $\Delta t_0$ is an exposure time long enough to provide an image with a sufficient SNR, and $FR_0$ is a frame rate low enough to minimize the image data that needs to be captured.

The method for determining the best frame rate and exposure time according to the present invention first acquires two successive frames from the image capture system, the first frame 18 denoted by $I_1(x,y)$ and the second frame 20 denoted by $I_2(x,y)$, where x and y are the spatial coordinates in pixels. The images are separated by a time interval $t'_{clock}$ and a frame rate $FR'=1/t'_{clock}$. The exposure time and frame rate used for the very first two frames of a video sequence is $\Delta t_0$ and $FR_0$.

The camera pointing may have changed between the two frames, so $I_1(x,y)$ and $I_2(x,y)$ must be spatially registered 26 to remove the displacement that may have occurred between the frames. The method in the preferred embodiment for spatially registering the two scenes calculates a correlation matrix $$C(\Delta x, \Delta y) = \sum_{x=1}^{N_x} \sum_{y=1}^{N_y} I_1(x+\Delta x, y+\Delta y) I_2(x, y), \qquad (8)$$

where $N_x$ is the number of pixels in the x-direction and $N_y$ is the number of pixels in the y-direction of $I_1(x,y)$ and $I_2(x,y)$. The values for $\Delta x$ and $\Delta y$ at which $C(\Delta x, \Delta y)$ is a maximum, $\Delta x_{max}$ and $\Delta y_{max}$, are the values of the scene displacement in the x-direction and the y-direction respectively. A spatially registered image $I'_2(x,y)$ is calculated by $$I'_2(x,y)=I_2(x-\Delta x_{max}, y-\Delta y_{max}). \qquad (9)$$

This method will only remove translation differences between the two frames. More robust frame registration algorithms can be used, e.g. affine transformations, especially if the image scale and rotation changes between the two frames (See *Digital Video Processing* by Murat Tekalp, Prentice Hall, 1995). Imaging acquisition parameters can also be used to predict the camera motion, scale and rotation changes.

Next, a means for detecting object motion between $I_1(x,y)$ and $I'_2(x,y)$ is employed 28. In the preferred embodiment a sub-block correlation algorithm is used. The image $I_1(x,y)$ is subdivided into sub-blocks, each of size $N_s \times N_s$ pixels. The sub-blocks need to be small enough to allow the motion of individual objects to be detected, but large enough to have statistically significant calculations. In the preferred embodiment, $N_s=16$. Each sub-block $I_s(x,y)$ is correlated with $I'_2(x,y)$, $$C_s(\Delta x, \Delta y) = \sum_{x=1}^{N_s} \sum_{y=1}^{N_s} I_s(x + \Delta x, y + \Delta y) I'_2(x, y). \quad (10)$$

The values for $\Delta x$ and $\Delta y$ at which $C_s(\Delta x, \Delta y)$ is a maximum are the values of the object displacement in the x-direction and the y-direction respectively for that sub-block. The distance, in pixels, that an object moved between $I_1(x,y)$ and $I'_2(x,y)$ is given by $$\Delta d = \sqrt{\Delta x^2 + \Delta y^2}. \quad (11)$$

The displacement of each moving object detected is calculated using the other sub-blocks and the largest displacement of an object between the two frames is set equal to $\Delta d_{fastest}$ 30. The speed of the fastest moving object, in pixels per second, is calculated 32 by $$v_{max} = \Delta d_{fastest} FR'. \quad (12)$$

If the frame rate $FR_0$ is used for the next frame $I_3(x,y)$, then the amount the object will be displaced between the first image frame 18 and the second image frame 20 can be calculated 34 by $$\Delta d_0 = v_{max} \frac{1}{FR_0}. \quad (13)$$

The displacement $\Delta d_0$ is compared 36 to the maximum displacement desired, $\Delta d_{max}$. If $\Delta d_0 \leq \Delta d_{max}$, then the frame rate $FR_0$ is used 38 for the next frame $I_3(x,y)$ of the video collection. In the preferred embodiment, $\Delta d_{max}$ is less than ten pixels, e.g. eight pixels. If $\Delta d_0 > \Delta d_{max}$, then a new frame rate is calculated 40 by $$FR = \frac{v_{max}}{\Delta d_{max}}, \quad (14)$$

and the frame rate FR is used 42 for the next frame $I_3(x,y)$ of the video collection.

If the exposure time $\Delta t_0$ is used for the next frame $I_3(x,y)$, then the amount of motion smear from the moving object can be calculated 44 by $$s_0 = v_{max} \Delta t_0 (\text{pixels}). \quad (15)$$

The smear $s_0$ is compared 46 with the maximum smear desired, $s_{max}$. If $s_0 \leq s_{max}$, where $s_{max}$ is the maximum smear desired, then the exposure time $\Delta t_0$ is used 48 for the next frame $I_3(x,y)$ of the video collection. In the preferred embodiment, $s_{max}$ is less than two pixels, e.g. 1.5 pixels. If $s_0 > s_{max}$, then a new exposure time is calculated 50 by $$\Delta t = \frac{s_{max}}{v_{max}}, \quad (16)$$

and exposure time $\Delta t$ is used 52 for the next frame $I_3(x,y)$ of the video collection.

Figure 5:
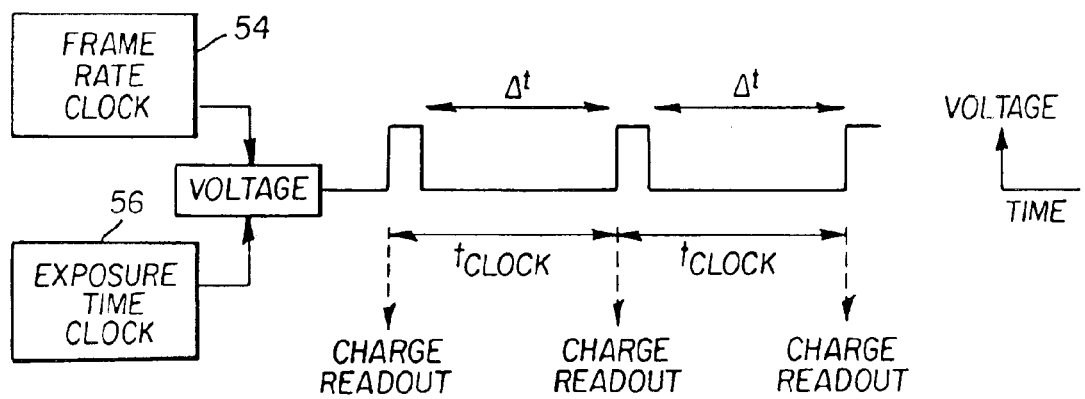
FIG. 5 shows a schematic of the sensor processor.

The sensor processor 24 in FIG. 3 is used to capture the image data from the digital image sensor 12 at an exposure time and frame rate that has been determined by the image processor 22. A schematic of the sensor processor 24 is shown in FIG. 5. The signal from the frame rate clock 54 determines the intervals at which the voltage levels in the digital image sensor 12 change, thus determining the frame rate. For an electronic shutter the signal from the exposure time clock 56 will vary the voltage levels such that the detector charge is collected for the desired time $\Delta t$. For faster performance the sensor processor can be designed such that only N possible exposure times are allowed, i.e.

$$\Delta t_n = \frac{n}{N} t_{clock}, \quad (17)$$

where n and N are integers, $n \leq N$, and the desired $\Delta t$ is rounded to the nearest $\Delta t_n$ value. The same may be true of the frame rate, i.e., the sensor processor can be designed such that only N possible frame rates are allowed. In practice, the new frame rate and exposure time may be selected from a predetermined set of frame rates and exposure times stored in a database, based on rounding the desired values to the nearest values in the database. Although an electronic shutter is described in the preferred embodiment, a mechanical shutter can be used to provide the desired exposure time and frame rate.

After the next frame is acquired with the desired exposure time and frame rate, the procedure outlined above is repeated for the next image frame, where $I_2(x,y)$ above becomes $I_1(x,y)$, and the frame just captured becomes $I_2(x,y)$.

In summary, in a method for determining the frame rate and exposure time for each frame of a video collection, the present invention requires the image capture system to acquire at least two successive frames of a scene, separated in time. The two images are compared to determine if objects in the scene are in motion. If motion is detected, then the speed and displacement of the objects that are moving is determined. If the speed of the fastest moving object creates an unacceptable amount of image displacement, then the frame rate for the next frame is changed to one that produces an acceptable amount of image displacement. Also, if the speed of the fastest moving object creates an unacceptable amount of motion blur, then the exposure time for the next frame is changed to one that produces an acceptable amount of motion blur. The exposure time is changed using a mechanical or electronic shutter.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | imaging lens |
| 12 | imaging sensor |
| 14 | moving object |
| 16 | field of view |
| 18 | first image frame |
| 20 | second image frame |
| 22 | image processor |
| 24 | sensor processor |
| 26 | register frames step |
| 28 | detect moving object step |
| 30 | determine $\Delta d_{fastest}$ step |
| 32 | calculate $v_{max}$ step |
| 34 | calculate object displacement $\Delta d_0$ step |
| 36 | compare $\Delta d_0$ step to $\Delta d_{max}$ step |
| 38 | set frame rate to $FR_0$ step |
| 40 | calculate new frame rate step |
| 42 | set frame rate to FR step |
| 44 | calculate object smear $s_0$ step |
| 46 | compare $s_0$ step to $s_{max}$ step |
| 48 | set exposure time to $\Delta t_0$ step |
| 50 | calculate new exposure time step |
| 52 | set exposure time to $\Delta t$ step |
| 54 | frame rate clock |
| 56 | exposure time clock |

What is claimed is:

1. A method of adaptively determining the exposure time and frame rate for each frame captured by an image capture system of the type having an image sensor, optics for forming an image of a scene on the image sensor, and an image processor for determining an exposure time for the image sensor, said method comprising the steps of:

a) acquiring two time-separated image frames during an initial exposure time set for each of the image frames, wherein each image frame includes one or more moving objects from the scene;

b) spatially registering the two image frames;

c) measuring spatial displacements between the two image frames for the same moving objects;

d) determining a fastest moving object in the scene from the measured spatial displacements;

e) calculating a speed of the fastest moving object;

f) calculating object smear for the fastest moving object based on the initial exposure time;

g) if the object smear exceeds a maximum desired smear, calculating a new exposure time;

h) setting the exposure time for a subsequent image frame to the new exposure time;

i) if the measured spatial displacement of the fastest moving object exceeds a maximum desired displacement, calculating a new frame rate; and j) setting the frame rate for a subsequent image frame to the new frame rate.

2. The method as claimed in claim 1 wherein the step b) of spatially registering the two image frames comprises generating a correlation matrix from pixels in the two image frames in order to remove translation differences between the two image frames.

3. The method as claimed in claim 1 wherein the step c) of measuring spatial displacements comprises the step of dividing one of the image frames into blocks and correlating each block with the other frame to detect the displacement of moving objects between the frames.

4. The method as claimed in claim 1 wherein the step h) of setting an exposure time comprises selecting one of a predetermined set of exposure times from a database.

5. The method as claimed in claim 1 wherein a mechanical shutter or an electronic shutter is used to control the exposure time.

6. A computer program product for adaptively determining the exposure time and frame rate for each frame captured by an image capture system of the type that acquires two time-separated image frames during an initial exposure time set for each of the image frames, wherein each image frame includes one or more moving objects from a scene, said computer program product comprising: a computer readable storage medium having a computer program stored thereon for performing the steps of:

a) spatially registering the two image frames;

b) measuring spatial displacements between the two image frames for the same moving objects;

c) determining a fastest moving object in the scene from the measured spatial displacements;

d) calculating a speed of the fastest moving object;

e) calculating object smear for the fastest moving object based on the initial exposure time;

f) if the object smear exceeds a maximum desired smear, calculating a new exposure time;

g) if the measured spatial displacement of the fastest moving object exceeds a maximum desired displacement, calculating a new frame rate; and h) setting the frame rate for a subsequent image frame to the new frame rate.

7. A method of adaptively determining the frame rate for each frame captured by an image capture system of the type having an image sensor, optics for forming an image of a scene on the image sensor, and an image processor for determining a frame rate for the image sensor, said method comprising the steps of:

a) acquiring two image frames separated in time by an initial frame rate, wherein each image frame includes one or more moving objects from the scene;

b) spatially registering the two image frames;

c) measuring spatial displacements between the two image frames for the same moving objects;

d) determining a fastest moving object in the scene from the measured spatial displacements;

e) calculating a speed of the fastest moving object;

f) calculating the object displacement based on the initial frame rate;

g) if the object displacement exceeds a maximum desired displacement, calculating a new frame rate; and h) setting the frame rate for a subsequent image frame to the new frame rate.

8. The method as claimed in claim 7 wherein the step b) of spatially registering the two image frames comprises generating a correlation matrix from pixels in the two image frames in order to remove translation differences between the two image frames.

9. The method as claimed in claim 7 wherein the step c) of measuring spatial displacements comprises the step of dividing one of the image frames into blocks and correlating each block with the other frame to detect the displacement of moving objects between the frames.

10. The method as claimed in claim 7 wherein the step h) of setting the frame rate comprises selecting one of a predetermined set of frame rates from a database.

11. The method as claimed in claim 7 wherein a mechanical shutter or electronic shutter is used to control the frame rate.

12. A computer program product for adaptively determining the frame rate for each frame captured by an image capture system of the type that acquires two image frames separated in time by an initial frame rate, wherein each image frame includes one or more moving objects from a scene, said computer program product comprising: a computer readable storage medium having a computer program stored thereon for performing the steps of:

a) spatially registering the two image frames;

b) measuring spatial displacements between the two image frames for the same moving objects;

c) determining a fastest moving object in the scene from the measured spatial displacements;

d) calculating a speed of the fastest moving object;

e) calculating the object displacement based on the initial frame rate; and f) if the object displacement exceeds a maximum desired displacement, calculating a new frame rate.

13. A method of adaptively determining the exposure time and frame rate for each frame of an image capture system of the type having an image sensor, optics for forming an image of a scene on the image sensor, and an image processor for determining an exposure time and frame rate for the image sensor, said method comprising the steps of:

a) acquiring two time-separated image frames according to an initial exposure time and an initial frame rate, wherein each image frame includes one or more moving objects from the scene;

b) spatially registering the two image frames;

c) measuring spatial displacements between the two image frames for the same moving objects;

d) determining a fastest moving object in the scene from the measured spatial displacements;

e) calculating a speed of the fastest moving object;

f) calculating object smear for the fastest moving object based on the initial exposure time;

g) if the object smear exceeds a maximum desired smear, calculating a new exposure time;

h) calculating the object displacement based on the initial frame rate;

i) if the object displacement exceeds a maximum desired displacement, calculating a new frame rate; and j) setting the exposure time and frame rate for the next image frame to the new exposure time and new frame rate.

14. The method as claimed in claim 13 wherein step a) involves the acquisition of a continuous sequence of successive image frames and the steps b) through j) are repeated for each pair of successive image frames.

15. A computer program product for adaptively determining the exposure time and frame rate for each frame captured by an image capture system of the type that acquires two time-separated image frames according to an initial exposure time and an initial frame rate, wherein each image frame includes one or more moving objects from a scene, said computer program comprising: a computer readable storage medium having a computer program stored thereon for performing the steps of:

a) measuring spatial displacements between the two image frames for the same moving objects;

b) calculating a speed of a fastest moving object;

c) calculating object smear for the fastest moving object based on the initial exposure time;

d) if the object smear exceeds a maximum desired smear, calculating a new exposure time;

e) calculating the object displacement based on the initial frame rate; and f) if the object displacement exceeds a maximum desired displacement, calculating a new frame rate.

* * * * *

UNITED STATES PATENT AND TRADEMARK OFFICE
CERTIFICATE OF CORRECTION

PATENT NO.    : 6,891,570 B2
DATED         : May 10, 2005
INVENTOR(S)   : Tantalo et al.

It is certified that error appears in the above-identified patent and that said Letters Patent is hereby corrected as shown below:

Title page,
Item [75], Inventors, please delete "Robert A" and insert -- Robert D --.

Signed and Sealed this

Thirtieth Day of August, 2005

JON W. DUDAS
*Director of the United States Patent and Trademark Office*